(12) United States Patent
Taylor

(10) Patent No.: US 10,602,686 B2
(45) Date of Patent: Mar. 31, 2020

(54) HYDROPONIC GROWING SYSTEM AND METHOD

(71) Applicant: Donald Taylor, Kinston, AL (US)

(72) Inventor: Donald Taylor, Kinston, AL (US)

( * ) Notice: Subject to any disclaimer, the term of this patent is extended or adjusted under 35 U.S.C. 154(b) by 237 days.

(21) Appl. No.: 15/947,723

(22) Filed: Apr. 6, 2018

(65) Prior Publication Data

US 2019/0098849 A1 Apr. 4, 2019

Related U.S. Application Data

(60) Provisional application No. 62/568,256, filed on Oct. 4, 2017.

(51) Int. Cl.
| | | |
|---|---|---|
| *A01G 31/02* | (2006.01) | |
| *A01G 27/00* | (2006.01) | |
| *A01G 9/02* | (2018.01) | |
| *A01G 31/00* | (2018.01) | |

(52) U.S. Cl.
CPC ............... *A01G 31/02* (2013.01); *A01G 9/02* (2013.01); *A01G 27/003* (2013.01); *A01G 27/006* (2013.01); *A01G 27/008* (2013.01); *A01G 2031/006* (2013.01)

(58) Field of Classification Search
CPC .... A01G 31/02; A01G 27/003; A01G 27/006; A01G 31/06
See application file for complete search history.

(56) References Cited

U.S. PATENT DOCUMENTS

| | | | |
|---|---|---|---|
| 3,323,253 A | 6/1967 | Robins | |
| 4,279,101 A | 7/1981 | Leroux | |
| 4,937,972 A * | 7/1990 | Freitus | A01G 27/003 47/62 R |
| 5,067,275 A | 11/1991 | Constance | |
| 5,337,515 A | 8/1994 | Robins | |
| 5,887,383 A * | 3/1999 | Soeda | A01G 31/02 47/59 R |
| 6,061,957 A * | 5/2000 | Takashima | A01G 22/15 47/66.1 |
| 8,621,781 B2 | 1/2014 | Singh | |
| 2008/0229661 A1* | 9/2008 | Brooke | A01G 31/02 47/62 R |
| 2009/0313894 A1 | 12/2009 | Bieber | |
| 2011/0023359 A1* | 2/2011 | Raring | A01G 31/02 47/62 A |
| 2015/0223418 A1* | 8/2015 | Collins | A01G 31/02 47/62 R |
| 2016/0227721 A1* | 8/2016 | Gomez | A01G 31/02 |
| 2017/0042101 A1* | 2/2017 | Soltani | A01G 27/003 |
| 2017/0099791 A1* | 4/2017 | Joseph | A01G 31/04 |

* cited by examiner

*Primary Examiner* — Monica L Williams

(57) ABSTRACT

A hydroponic growing system is disclosed herein. The hydroponic growing system includes a plurality of plant containers, a nutrient reservoir, a nutrient control tower, a plumbing means, a pump, and an overflow tube. The hydroponic growing system is useful for pumping a nutrient solution to the plurality of plant containers from the nutrient reservoir. A method is also disclosed herein.

18 Claims, 5 Drawing Sheets

HYDROPONIC GROWING SYSTEM AND METHOD

CROSS-REFERENCE TO RELATED APPLICATION(S)

The present application is related to and claims priority to U.S. Provisional Patent Application No. 62/568,256 filed Oct. 4, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of plant cultivation of existing art and more specifically relates to hydroponic cultivation.

RELATED ART

Plant cultivation or horticulture is the science and art of growing plants (fruits, vegetables, flowers, and any other cultivar). It also includes plant conservation, landscape restoration, soil management, or the like. Growing fruit, vegetables, herbs, and flowers in soil can be a lengthy process and result in a mediocre output. The produce is often not as healthy or as good tasting and good looking as it could be. Individuals may lose potential income due to the subpar results. A subset of plant cultivation is hydroponics. Hydroponics involves a method of growing plants without soil, using mineral nutrient solutions. Plants may be grown with only their roots exposed to the mineral solution, or the roots may be supported by an inert medium.

Hydroponics is a well-known art. However, systems currently available are not efficient for the average user. They can be hard to assemble and do not allow the user to expand without purchasing additional systems. Furthermore, it can be hard to maintain the growth of plants with current systems. Therefore, a suitable solution is desired.

U.S. Pat. No. 5,337,515 to Kevin J. Robins relates to a hydroponic gardening method and apparatus. The described hydroponic gardening method and apparatus includes an apparatus for hydroponic cultivation including a pneumatic pump, a pumping tank, an overflow tank, a pneumatic valve, solution distribution tubing, and a plant growing container. The configuration presented achieves the results required from such a system in that is inexpensive to develop and works effectively with low maintenance. The system has the added feature of applying air directly to the roots of the plants at selected intervals.

SUMMARY OF THE INVENTION

In view of the foregoing disadvantages inherent in the known hydroponic cultivation art, the present disclosure provides a novel hydroponic growing system and method. The general purpose of the present disclosure, which will be described subsequently in greater detail, is to provide a hydroponic growing system and method.

A hydroponic growing system is disclosed herein. The hydroponic growing system includes a plurality of plant containers, a nutrient reservoir, a nutrient control tower, a plumbing means, a pump, and an overflow tube. The plurality of plant containers are configured to hold a plurality of plants, respectively, and to hold a nutrient solution, each of the plurality of plant containers having a bottom and a nutrient solution port proximate the bottom. The nutrient reservoir is configured to hold a surplus of the nutrient solution for the plurality of plants. The nutrient control tower is hydraulically coupled to the nutrient reservoir and configured to maintain a predetermined hydraulic head of the nutrient solution, the predetermined hydraulic head corresponding to an acceptable nutrient solution level within the plurality of plant containers, the acceptable nutrient solution level being a maximum allowable level and minimum allowable level. The plumbing means is configured to hydraulically couple the nutrient control tower to each nutrient solution port of the plurality of plant containers. The pump is be configured to pump the nutrient solution from the nutrient reservoir to the nutrient control tower. The overflow tube is configured to return the nutrient solution to the nutrient reservoir when the predetermined hydraulic head of the nutrient solution is exceeded.

According to another embodiment, a method of using a hydroponic growing system is also disclosed herein. The method includes providing a hydroponic growing system as described above; assembling the hydroponic growing system; powering the pump via an external power source; and filling the plurality of plant containers with a growing medium.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a hydroponic growing system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to hydroponic cultivation, and more particularly to a hydroponic growing system and method as used to improve the plant cultivation with hydroponics.

Generally, hydroponics is a subset of plant cultivation, and is a method of growing plants using mineral nutrient solutions, in water, without soil. Terrestrial plants may be grown with their roots in the nutrient solution only, or in an inert medium, such as perlite or gravel. The nutrients in hydroponics can be from fish waste, normal nutrients, or duck manure. Water is typically flushed and recirculated to continue providing the appropriate amount of nutrients. The present disclosure may provide a hydroponic system designed to be used outdoors in natural light or indoors to grow superior fruits, vegetables, herbs, and flowers. In this way, the system may grow better quality produce faster and easier than when growing in soil. This further allows any type of grower, professional or amateur, to setup and use. The present disclosure can offer a way to grow better tasting and more nutritious vegetables.

Referring now more specifically to the drawings by numerals of reference, there is shown in FIGS. 1-4, various views of a hydroponic growing system 100.

Figure 1:
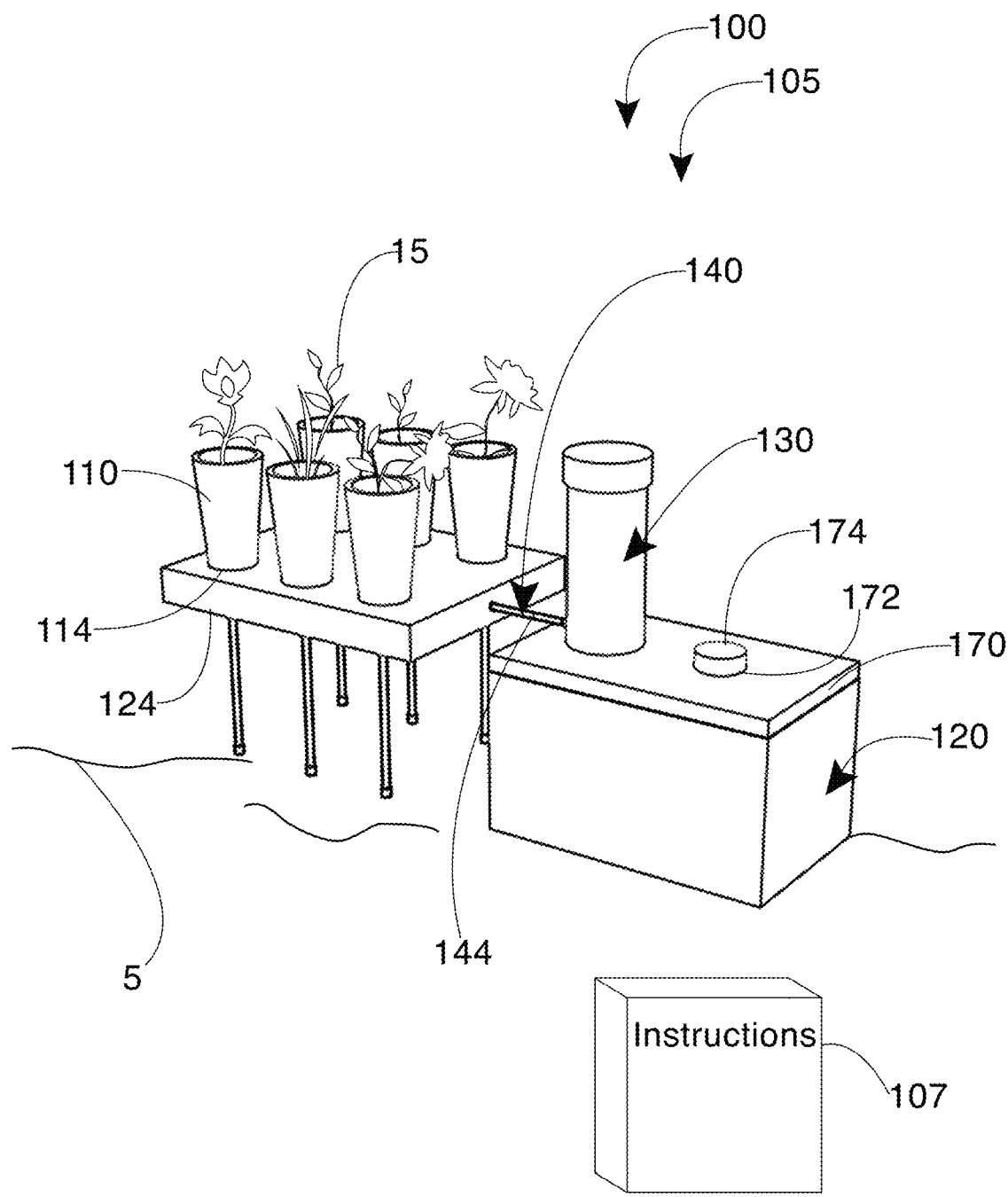
FIG. 1 is a perspective view of the hydroponic growing system, according to an embodiment of the disclosure.

FIG. 1 shows a hydroponic growing system, according to an embodiment of the present disclosure. Here, the hydroponic growing system 100 may be beneficial to improve the use of hydroponics for home and residential gardening. As illustrated, the hydroponic growing system 100 may include a plurality of plant containers 110 configured to hold a plurality of plants 15, respectively, and to hold a nutrient solution 112 (FIG. 4), each of the plurality of plant containers 110 having a bottom 114 and a nutrient solution port proximate the bottom 114.

The hydroponic growing system 100 may further include a nutrient reservoir 120 which may be configured to hold a surplus of the nutrient solution 112 for the plurality of plants 15. A nutrient control tower 130 may be hydraulically coupled to the nutrient reservoir 120 and configured to maintain a predetermined hydraulic head of the nutrient solution 112. The predetermined hydraulic head corresponds to an acceptable nutrient solution level 122 (FIG. 4) within the plurality of plant containers 110.

Figure 2:
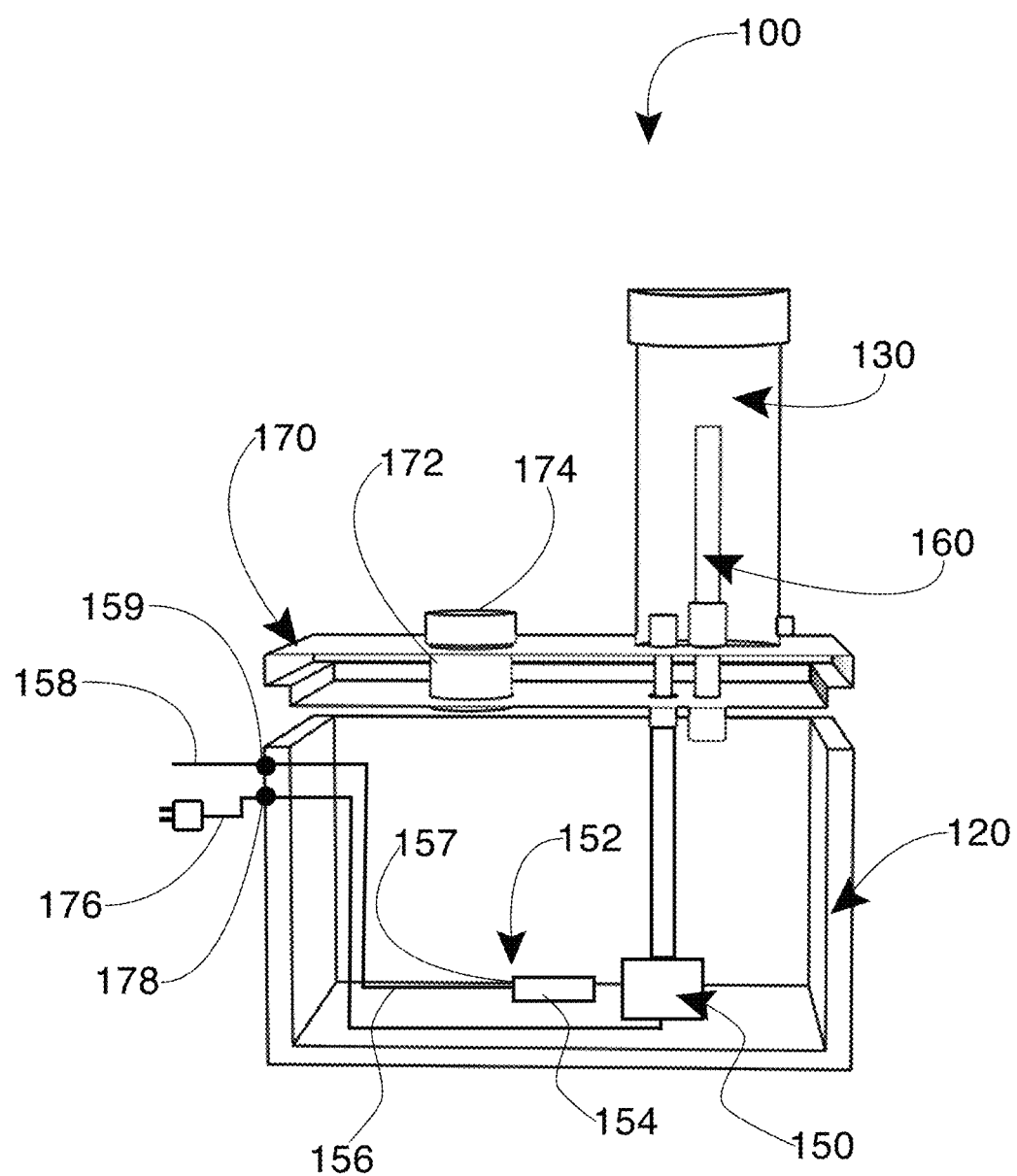
FIG. 2 is a partially exploded, cut-away view of the hydroponic growing system of FIG. 1, according to an embodiment of the present disclosure.

Additionally, the hydroponic growing system 100 includes a plumbing means 140 and a pump 150 (FIG. 2), and an overflow tube 160 (FIG. 2). The plumbing means 140 may be configured to hydraulically couple the nutrient control tower 130 to each nutrient solution port of the plurality of plant containers 110. The plumbing means 140 may include at least one tubing 144 configured to hydraulically couple the nutrient control tower 130 to each nutrient solution port of the plurality of plant containers 110. The plumbing means 140 may include any circuit or system that conveys fluids within the hydroponic growing system 100, and may utilize any combination of tubing/pipes, valves, plumbing fixtures, tanks, and other apparatuses to convey the nutrient solution 112. The pump 150 may be configured to pump the nutrient solution 112 from the nutrient reservoir 120 to the nutrient control tower 130. The overflow tube 160 may be configured to return the nutrient solution 112 to the nutrient reservoir 120 when the predetermined hydraulic head of the nutrient solution 112 is exceeded.

The hydroponic growing system may further include a platform 124 configured to elevate the plurality of plant containers 110 above a surface 5. The platform 124 may preferably include a stand, table, or the like. One or more platform(s) 124 may be connected via the plumbing means 140 to allow additional cultivation of the plurality of plants 15 within the plurality of plant containers 110.

According to one embodiment, the hydroponic growing system 100 may be arranged as a kit 105. In particular, the hydroponic growing system 100 may further include a set of instructions 107. The instructions 107 may detail functional relationships in relation to the structure of the hydroponic growing system 100 such that the hydroponic growing system 100 can be used, maintained, or the like, in a preferred manner.

Figure 4:
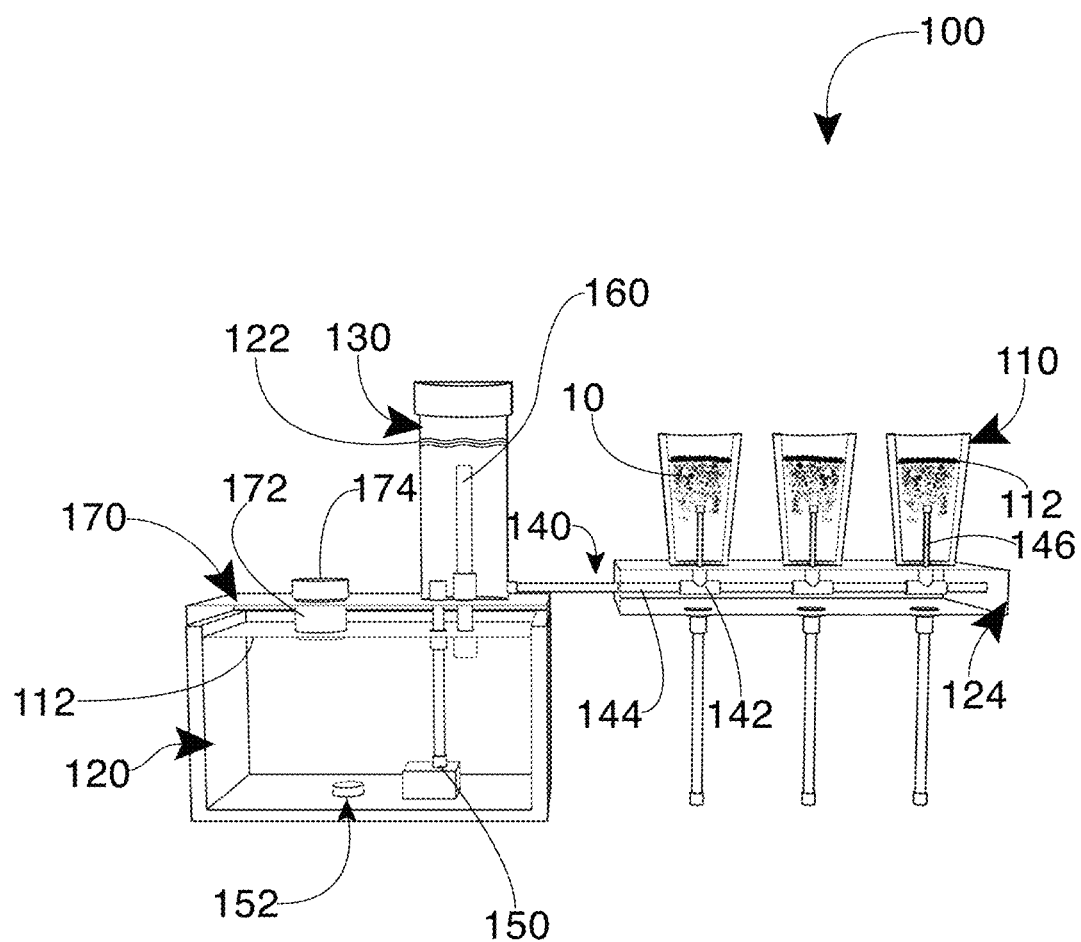
FIG. 4 is a cut-away view of the hydroponic growing system of FIG. 1, according to an embodiment of the present disclosure.

FIG. 2 shows the hydroponic growing system 100 of FIG. 1, according to an embodiment of the present disclosure. As above, the hydroponic growing system 100 may include the nutrient control tower 130 hydraulically coupled to the nutrient reservoir 120 and configured to maintain the predetermined hydraulic head of the nutrient solution 112 (FIG. 4).

The nutrient reservoir 120 may include an aeration system 152 configured to aerate the nutrient solution 112 while in the nutrient reservoir 120. The aeration system 152 may include an air-stone 154 configured to diffuse air, and an aeration-tube 156 pneumatically coupled to the air-stone 154 and configured to deliver air to the aeration-tube 156. The aeration-tube 156 has a first-end 157 coupled to the air-stone 154, and also has a second-end 158 opposite the first-end 157, the second-end 158 being positioned outside the nutrient reservoir 120. The nutrient reservoir 120 may further include a first-aperture 159 configured to receive the second-end 158 therethrough.

Additionally, in accordance to the present embodiment, the nutrient reservoir 120 may include a lid 170 that is removable. The lid 170 may be removed for maintenance, cleaning, and the like. The lid 170 further provides a lid-port 172 with a removable-cap 174. The lid-port 172 may be configured for easily adding or removing the nutrient solution 112 to/from the nutrient reservoir 120. The removable-cap 174 may be coupled to the lid-port 172 via threads, snaps, or the like.

The pump 150 may further include a power-supply (not shown) configured to power the pump 150. The power-supply may include a power cord 176 (e.g., including a plug terminal) configured to electrically couple and communicate power from an external power source to the power-supply. The external power source may include a wall-outlet, battery, power generator, etc. In order to couple to the external power source, the nutrient reservoir 120 may include a second-aperture 178, the second-aperture 178 configured to receive the power cord 176 therethrough. Additionally, a timer (not shown) can be utilized with the pump 150 to regulate the flow of the nutrient solution 112 to the nutrient control tower 130.

Figure 3A:
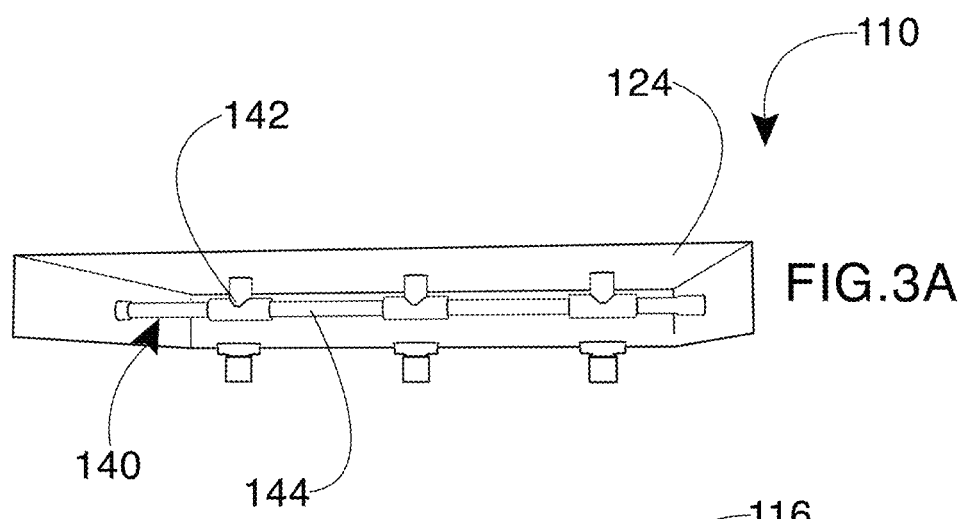
FIG. 3A is a cut-away view of the hydroponic growing system of FIG. 1, according to an embodiment of the present disclosure.

FIG. 3A is a cut-away view of the hydroponic growing system 100 of FIG. 1, according to an embodiment of the present disclosure. As shown, at least one section of the plumbing means 140 may be embedded in the platform 124, and the plumbing means 140 may include a plurality of T's or flow dividers 142, each configured to receive the nutrient solution 112 from the nutrient control tower 130, and pass a portion of the nutrient solution 112 to one of the plurality of plant containers 110 and the rest of the nutrient solution 112 downstream of the respective flow divider 142.

Figure 3B:
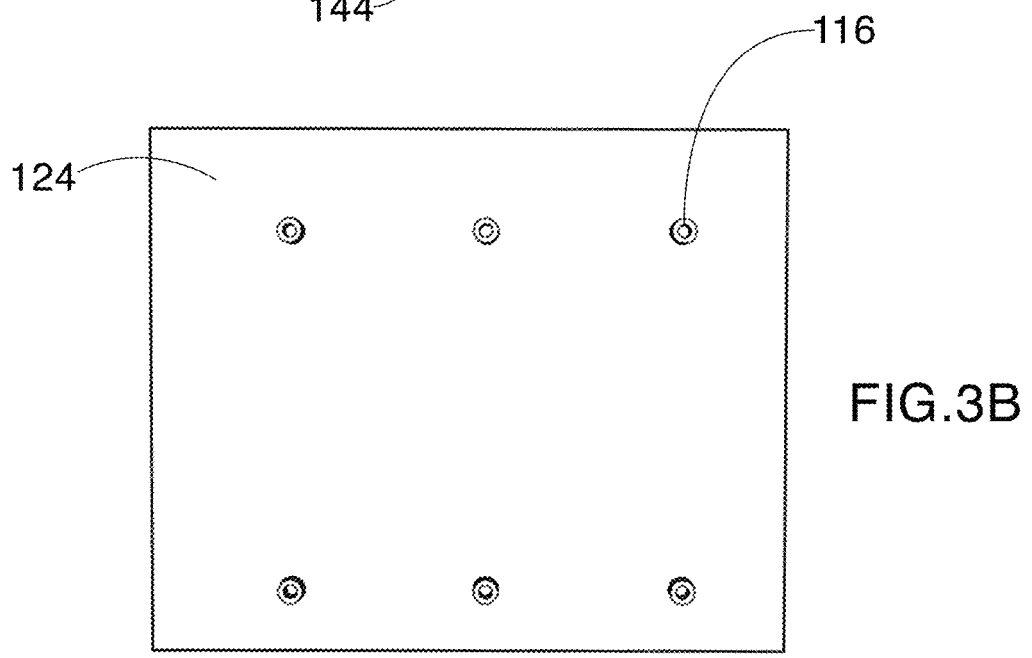
FIG. 3B is a top view of the hydroponic growing system of FIG. 1, according to an embodiment of the present disclosure.

FIG. 3B is a top view of portions of the hydroponic growing system 100 of FIG. 1, according to an embodiment of the present disclosure. Each of the plurality of plant containers 110 has the bottom 114 and the nutrient solution port proximate the bottom 114. The plumbing means 140 may pass the nutrient solution 112 from the at least one tubing 144 to the nutrient solution port at an interface 116 between the plumbing means 140 and each plant container 110, and passing through the platform 124.

FIG. 4 is a cut-away view of the hydroponic growing system 100 of FIG. 1, according to an embodiment of the present disclosure. The nutrient control tower 130 and the plurality of plant containers 110 may be configured to be maintained "leveled" in relation to each other, respective to the predetermined hydraulic head of the nutrient solution 112 and corresponding to the acceptable nutrient solution level 122. As shown, the acceptable nutrient solution level 122 is between a maximum allowable level and minimum allowable level. The platform 124 may be configured to maintain the plurality of plant containers 110 leveled in relation to each other, individually or en masse.

According to one embodiment, the plumbing means 140 may include a root barrier filter 146 at each nutrient solution port 116. Each root barrier filter 146 is configured to inhibit blockage of its respective nutrient solution port 116 by plant roots. A growing medium 10 may further be included within each of the plurality of plant containers 110. The growing medium 10 may preferably comprise of pea stone, but not limited to such material.

Those with ordinary skill in the art will now appreciate that upon reading this specification and by their understanding the art of hydroponics as described herein, methods of the hydroponic growing system 100 will be understood by those knowledgeable in such art.

Figure 5:
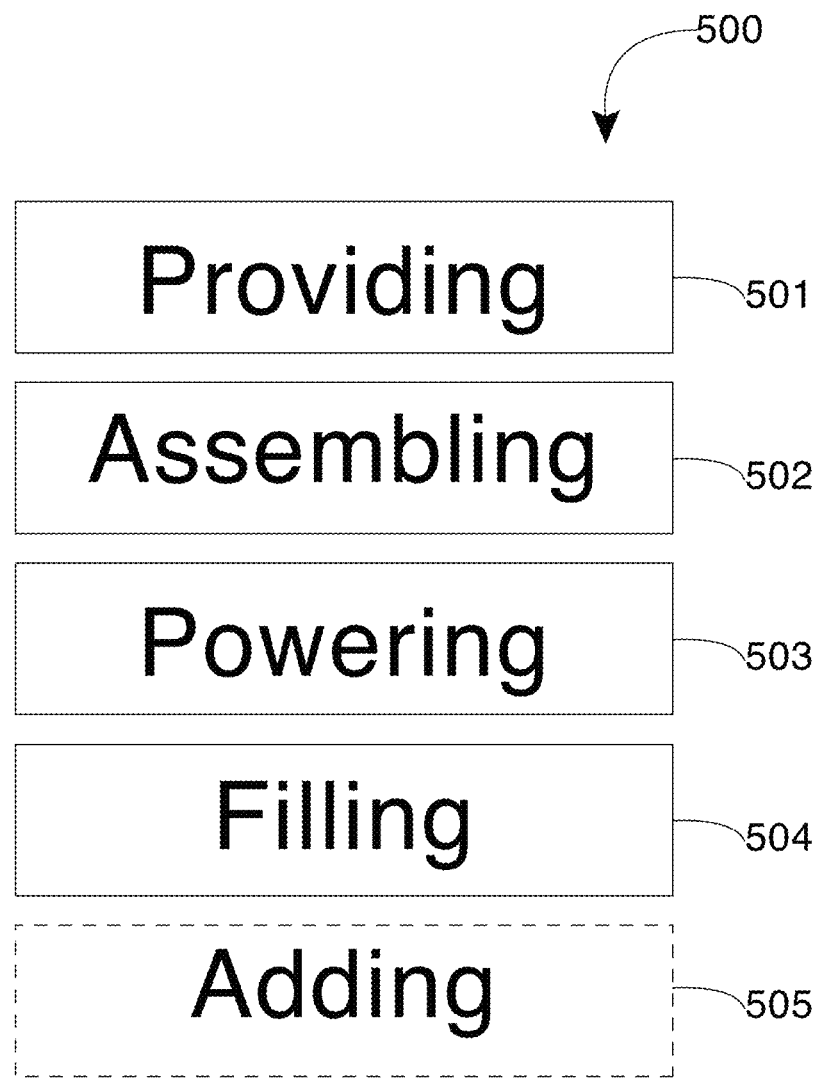
FIG. 5 is a flow diagram illustrating a method of using a hydroponic growing system, according to an embodiment of the present disclosure.

FIG. 5 is a flow diagram illustrating a method for using a hydroponic growing system 500, according to an embodiment of the present disclosure. In particular, the method 500 for using the hydroponic growing system may include one or more components or features of the hydroponic growing system 100 as described above. As illustrated, the method 500 for using the hydroponic growing system may include the step of: step one 501, providing a hydroponic growing system 100 including a plurality of plant containers 110 configured to hold a plurality of plants 15, respectively, and to hold a nutrient solution 112, each of the plurality of plant containers 110 having a bottom 114 and a nutrient solution port 116 proximate the bottom 114; a nutrient reservoir 120 configured to hold a surplus of the nutrient solution 112 for the plurality of plants 15; a nutrient control tower 130 hydraulically coupled to the nutrient reservoir 120 and configured to maintain a predetermined hydraulic head of the nutrient solution 112; a plumbing means 140 configured to hydraulically couple the nutrient control tower 130 to each nutrient solution port 116 of the plurality of plant containers 110; a pump 150 configured to pump the nutrient solution 112 from the nutrient reservoir 120 to the nutrient control tower 130; and an overflow tube 160 configured to return the nutrient solution 112 to the nutrient reservoir 120 when the predetermined hydraulic head of the nutrient solution 112 is exceeded. The method 500 may further include the steps of: step two 502, assembling the hydroponic growing system 100; step three 503, powering the pump 150 via an external power source; and step four 504, filling the plurality of plant containers 110 with a growing medium 10. The method 500 may further include step five 505, adding one or more platform(s) 124 to the hydroponic growing system 100.

It should be noted that step five 505 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for plant cultivation using hydroponics (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:
1. A hydroponic growing system comprising:
a plurality of plant containers configured to hold a plurality of plants, respectively, and to hold a nutrient solution, each of the plurality of plant containers having a bottom and a nutrient solution port proximate the bottom;
a nutrient reservoir configured to hold a surplus of the nutrient solution for the plurality of plants;
a nutrient control tower hydraulically coupled to the nutrient reservoir and configured to maintain a predetermined hydraulic head of the nutrient solution, said predetermined hydraulic head corresponding to an acceptable nutrient solution level within the plurality of plant containers, the acceptable nutrient solution level being between a maximum allowable level and minimum allowable level;
a plumbing means configured to hydraulically couple the nutrient control tower to each nutrient solution port of the plurality of plant containers;
a pump configured to pump the nutrient solution from the nutrient reservoir to the nutrient control tower; and
an overflow tube configured to return the nutrient solution to the nutrient reservoir when the predetermined hydraulic head of the nutrient solution is exceeded;
wherein the nutrient control tower and the plurality of plant containers are configured to be maintained leveled in relation to each other, respective to the predetermined hydraulic head of the nutrient solution.
2. The hydroponic growing system of claim 1, further comprising a platform configured to elevate the plurality of plant containers above a surface.

3. The hydroponic growing system of claim 2, wherein at least one section of the plumbing means is embedded in the platform, and the plumbing means includes a plurality of flow dividers, each configured to receive the nutrient solution from the nutrient control tower and pass a portion of the nutrient solution to one of the plurality of plant containers and a rest of the nutrient solution downstream of the respective flow divider.

4. The hydroponic growing system of claim 1, wherein the nutrient reservoir includes an aeration system configured to aerate the nutrient solution while in the nutrient reservoir.

5. The hydroponic growing system of claim 4, wherein the aeration system includes an air-stone configured to diffuse air, and an aeration-tube pneumatically coupled to the air-stone and configured to deliver air to the aeration-tube.

6. The hydroponic growing system of claim 5, wherein the aeration-tube has a first-end coupled to the air-stone, and also has a second-end opposite the first-end, the second-end being positioned outside the nutrient reservoir.

7. The hydroponic growing system of claim 6, wherein the nutrient reservoir includes a first-aperture configured to receive the second-end therethrough.

8. The hydroponic growing system of claim 1, wherein the nutrient reservoir includes a lid that is removable.

9. The hydroponic growing system of claim 8, wherein the lid includes a lid-port with a removable-cap.

10. The hydroponic growing system of claim 1, wherein the pump includes a power-supply configured to power the pump.

11. The hydroponic growing system of claim 10, wherein the power-supply includes a power cord configured to electrically couple and communicate power from an external power source to the power-supply.

12. The hydroponic growing system of claim 11, wherein the nutrient reservoir includes a second-aperture, said second-aperture configured to receive the power cord therethrough.

13. The hydroponic growing system of claim 1, further comprising a growing medium within each of the plurality of plant containers.

14. The hydroponic growing system of claim 1, wherein the plumbing means includes at least one tubing configured to hydraulically couple the nutrient control tower to each nutrient solution port of the plurality of plant containers.

15. The hydroponic growing system of claim 1, wherein the plumbing means includes a root barrier filter at each nutrient solution port, each root barrier filter configured to inhibit blockage of its respective nutrient solution port by plant roots.

16. A hydroponic growing system comprising:
a plurality of plant containers configured to hold a plurality of plants, respectively, and to hold a nutrient solution, each of the plurality of plant containers having a bottom and a nutrient solution port proximate the bottom;
a nutrient reservoir configured to hold a surplus of the nutrient solution for the plurality of plants
a nutrient control tower hydraulically coupled to the nutrient reservoir and configured to maintain a predetermined hydraulic head of the nutrient solution, said predetermined hydraulic head corresponding to an acceptable nutrient solution level within the plurality of plant containers, the acceptable nutrient solution level being between a maximum allowable level and minimum allowable level;
a plumbing means configured to hydraulically couple the nutrient control tower to each nutrient solution port of the plurality of plant containers;
a pump configured to pump the nutrient solution from the nutrient reservoir to the nutrient control tower;
an overflow tube configured to return the nutrient solution to the nutrient reservoir when the predetermined hydraulic head of the nutrient solution is exceeded;
a platform configured to elevate the plurality of plant containers above a surface; and
a growing medium within each of the plurality of plant containers;
wherein the nutrient control tower and the plurality of plant containers are configured to be maintained leveled in relation to each other, respective to the predetermined hydraulic head of the nutrient solution;
wherein at least one section of the plumbing means is embedded in the platform, and the plumbing means includes a plurality of flow dividers, each configured to receive the nutrient solution from the nutrient control tower and pass a portion of the nutrient solution to one of the plurality of plant containers and a rest of the nutrient solution downstream of the respective flow divider;
wherein the nutrient reservoir includes an aeration system configured to aerate the nutrient solution while in the nutrient reservoir;
wherein the aeration system includes an air-stone configured to diffuse air, and an aeration-tube pneumatically coupled to the air-stone and configured to deliver air to the aeration tube;
wherein the aeration-tube has a first-end coupled to the air-stone, and also has a second-end opposite the first-end, the second-end being positioned outside the nutrient reservoir;
wherein the nutrient reservoir includes a first-aperture configured to receive the second-end therethrough;
wherein the nutrient reservoir includes a lid that is removable;
wherein the lid includes a lid-port with a removable-cap;
wherein the pump includes a power-supply configured to power the pump;
wherein the power-supply includes a power cord configured to electrically couple and communicate power from an external power source to the power-supply;
wherein the nutrient reservoir includes a second-aperture, said second-aperture configured to receive the power cord therethrough;
wherein the plumbing means includes at least one tubing configured to hydraulically couple the nutrient control tower to each nutrient solution port of the plurality of plant containers; and
wherein the plumbing means includes a root barrier filter at each nutrient solution port, each root barrier filter configured to inhibit blockage of its respective nutrient solution port by plant roots.

17. The hydroponic growing system of claim 16, further comprising set of instructions; and
wherein the hydroponic growing system is arranged as a kit.

18. A method of using a hydroponic growing system, the method comprising the steps of:
providing a hydroponic growing system including
a plurality of plant containers configured to hold a plurality of plants, respectively, and to hold a nutrient solution, each of the plurality of plant containers having a bottom and a nutrient solution port proximate the bottom, a nutrient reservoir configured to hold a surplus of the nutrient solution for the plurality of plants, a nutrient control tower hydraulically coupled to the nutrient reservoir and configured to maintain a predetermined hydraulic head of the nutrient solution, a plumbing means configured to hydraulically couple the nutrient control tower to each nutrient solution port of the plurality of plant containers, a pump configured to pump the nutrient solution from the nutrient reservoir to the nutrient control tower, an overflow tube configured to return the nutrient solution to the nutrient reservoir when the predetermined hydraulic head of the nutrient solution is exceeded, and at least one platform, said platform configured to elevate at least one of the plurality of plant containers above a surface;

assembling the hydroponic growing system;

powering the pump via an external power source; and filling the plurality of plant containers with a growing medium.

\* \* \* \* \*